US012725039B2

(12) United States Patent
Gallusser et al.

(10) Patent No.: US 12,725,039 B2
(45) Date of Patent: Sep. 1, 2026

(54) GENERATION OF WEIGHTS FOR CAUSAL INFERENCES

(71) Applicant: Disney Enterprises, Inc., Burbank, CA (US)

(72) Inventors: Fabian Gallusser, Palo Alto, CA (US); Corey Katz, Irvine, CA (US); Huancen Liu, Brooklyn, NY (US)

(73) Assignee: Disney Enterprises, Inc., Burbank, CA (US)

( * ) Notice: Subject to any disclaimer, the term of this patent is extended or adjusted under 35 U.S.C. 154(b) by 565 days.

(21) Appl. No.: 18/357,967

(22) Filed: Jul. 24, 2023

(65) Prior Publication Data

US 2024/0054343 A1 Feb. 15, 2024

Related U.S. Application Data

(60) Provisional application No. 63/397,716, filed on Aug. 12, 2022.

(51) Int. Cl.
*G06N 3/08* (2023.01)

(52) U.S. Cl.
CPC .................................... *G06N 3/08* (2013.01)

(58) Field of Classification Search
CPC ................................ G06N 3/08; G06N 20/00
See application file for complete search history.

(56) References Cited

U.S. PATENT DOCUMENTS

| | | | | |
|---|---|---|---|---|
| 12,535,801 | B2 * | 1/2026 | Cella | B62D 15/0215 |
| 2018/0225720 | A1 * | 8/2018 | Singh | G06Q 30/0271 |
| 2021/0012190 | A1 * | 1/2021 | Murali | G06F 17/11 |
| 2023/0196724 | A1 * | 6/2023 | Wei | G06V 20/48 386/241 |
| 2023/0274132 | A1 * | 8/2023 | Cai | G06N 3/08 706/15 |

OTHER PUBLICATIONS

Barter, Rebecca. "The Intuition behind Inverse Probability Weighting in Causal Inference." Www.rebeccabarter.com, Jul. 5, 2017, www.rebeccabarter.com/blog/2017-07-05-ip-weighting/#:~:text=Inverse%2Dprobability%20weighting%20removes%20confounding. Accessed Jun. 13, 2022.

(Continued)

*Primary Examiner* — Sm A Rahman
(74) *Attorney, Agent, or Firm* — Kwan & Olynick LLP

(57) ABSTRACT

In some embodiments, a method receives input data to calculate an effect of a variable on a group for a plurality of methods. Methods in the plurality of methods calculate the effect of the variable for the input data using different logic. A plurality of sub-weights for methods in the plurality of methods are generated. The sub-weights are generated based on a balance metric, a dissimilarity metric, and a reliability metric. The method combines the plurality of sub-weights for methods in the plurality of methods to generate a final weight for the methods. The respective final weight is applied to an intermediate result from a respective method in the plurality of methods to generate a weighted intermediate result for the method. The method combines weighted intermediate results for the plurality of methods to generate a final result for the effect of the variable.

20 Claims, 8 Drawing Sheets

(56) References Cited

OTHER PUBLICATIONS

Blackwell, M. (Jan. 4, 2017). A selection bias approach to sensitivity analysis for causal effects: Political analysis. Cambridge Core. https://www.cambridge.org/core/journals/political-analysis/article/selection-bias-approach-to-sensitivity-analysis-for-causal-effects/788C169FAF5482452566811136D4F9B4.
Funk, M. J., Westreich, D., Wiesen, C., Stürmer, T., Brookhart, M. A., & Davidian, M. (Apr. 1, 2011). Doubly robust estimation of causal effects. American journal of epidemiology. Retrieved Jun. 13, 2022, from https://www.ncbi.nlm. nih.gov/pmc/articles/PMC3070495/#:~:text=Doubly%20robust%20estimation%20combines%20a,an%20exposure%20on%20an%20outcome.
H. Chen, T. Harinen, J.-Y. Lee, M. Yung and Z. Zhao, Causalml: Python package for causal machine learning, 2020.
Hernán MA, Robins JM (2020). Causal Inference: What If. Boca Raton: Chapman & Hall/CRC.
Künzel, S. R., Sekhon, J. S., Bickel, P. J., & Yu, B. (Apr. 24, 2019). Meta-learners for estimating heterogeneous treatment effects using machine learning. arXiv.org. Retrieved Jun. 10, 2022, from https://arxiv.org/abs/1706.03461.
Li F, Thomas LE, Li F. Addressing Extreme Propensity Scores via the Overlap Weights. Am J Epidemiol. Jan. 1, 2019;188(1):250-257. doi: 10.1093/aje/kwy201. PMID: 30189042.
Opossum GitHub Page. Retrieved Jan. 5, 2021, https://github.com/jgitr/opossum/tree/master, 4 pages.
Python-causality-handbook GitHub Page. Retrieved 02-04-202. https://matheusfacure.github.io/python-causality-handbook/12-Doubly-Robust-Estimation.html.
Sizemore, Samantha, and Raiber Alkurdi. "Matching Methods for Causal Inference: A Machine Learning Update." Applied Predictive Modeling, Humboldt University of Berlin, Aug. 18, 2019.
Winkel, Julian, and Tobias Krebs. "Data Generating Process Simulation: The Opossum Package." Applied Predictive Modeling, Humboldt University of Berlin, Aug. 18, 2019.

* cited by examiner

300

| Treatment-to-Control ratio (302) | Method (304) | Absolute Error (306) | Rank (308) | Ranked Weight (1/Rank) (310) |
|---|---|---|---|---|
| 10:90 | A | 0.3 | 2 | 1/2 |
| 10:90 | B | 0.1 | 1 | 1/1 |
| 10:90 | C | 0.5 | 3 | 1/3 |
| 20:80 | A | 0.04 | 1 | 1/1 |
| 20:80 | B | 0.1 | 3 | 1/3 |
| 20:80 | C | 0.06 | 2 | 1/2 |
| ... | .... | ... | ... | ... |

312 (rows 10:90); 314 (rows 20:80)

| Method (402) | Balance (404) | Dissimilarity across methods (406) | Model Reliability (408) | Method Weight (410) |
|---|---|---|---|---|
| S-learner | w_S,A | w_S,S = ⅓ if T and X included | w_S,R = 1/CIW | w_S = w_S,A * w_S,S * w_S,R |
| T-learner | w_T,A | w_T,S = ⅓ if S and X included | w_T,R = 1/CIW | w_T = w_T,A * w_T,S * w_T,R |
| X-learner | w_X,A | w_X,S = ⅓ if T and S included | w_X,R = 1/CIW | w_X = w_X,A * w_X,S * w_X,R |
| Linear Regression | w_L,A | w_L,S = ⅓ if IPW and DR included | w_L,R = 1/CIW | w_L = w_L,A * w_L,S * w_L,R |
| IPW | w_I,A | w_I,S = ⅓ if Lin and DR included | w_I,R = 1/CIW | w_I = w_I,A * w_I,S * w_I,R |
| Doubly Robust | w_D,A | w_D,S = ⅓ if IPW and Lin included | w_D,R = 1/CIW | w_D = w_D,A * w_D,S * w_D,R |
| Propensity Score Matching | w_P,A | w_S,S = 1 | w_P,R = 1/CIW | w_P = w_P,A * w_P,S * w_P,R |

FIG. 4

GENERATION OF WEIGHTS FOR CAUSAL INFERENCES

CROSS REFERENCE TO RELATED APPLICATIONS

Pursuant to 35 U.S.C. § 119(e), this application is entitled to and claims the benefit of the filing date of U.S. Provisional App. No. 63/397,716 filed Aug. 12, 2022, entitled "TECHNIQUES FOR RUNNING RELIABLE AND ROBUST CAUSAL INFERENCES AT SCALE", the content of which is incorporated herein by reference in its entirety for all purposes.

BACKGROUND

A system may analyze data for a company. For example, a company may want to assess the causal inference of a treatment on a group, which may be a group of members (e.g., users, devices, households, etc.). The system may be modeled to analyze data to determine an answer for the following question of "What is the impact of X on Y?". The variable "X" may be the treatment and the variable "Y" may be a metric for the group. The metric may be churn rate for a household, engagement for a user account, latency rate on a device, etc. In some examples, the specific questions may be answered of: "What is the impact of streaming a title of movie name Z on the long-term value of users?", "What is the impact of installing an application on mobile devices for future retention of users?", "What is the value of making a title available in another language on engagement?", etc.

An issue in determining answers to these questions may be the presence of bias, such as self-selection bias, and confounding. Self-selection bias may be where individuals may have the ability to choose whether to participate in the groups, and these individuals may have their own preferences, which may result in bias that may not be truly representative of the entire population. Confounding may be where the relationship between X and Y may be distorted by another variable. For example, the group exposed to the treatment X is not necessarily comparable to the group that is not exposed, so a direct comparison of metric Y between two groups can be misleading. In some examples, households with younger children may be more likely to stream a children's movie and more likely to continue membership with the video delivery service. However, using a direct comparison to conclude that streaming the children's movie name Z might not have any impact on whether the household decides to cancel the service would suggest that streaming the children's movie "name Z" decreases the probability of cancelation. However, in reality, the confounding variable may be that the household had younger children that would stream the children's movie name Z and also are unlikely to cancel the service due to having children, rather than concluding what was streamed decreased the probability of canceling the service.

There may be different models that can be used to assess the above questions. However, depending on the different characteristics of the input data being analyzed, different models may perform differently. For example, some models may perform better when different levels of bias exist in the input data. However, it cannot be certain which model may perform optimally. Depending on the model that is used to address the question, the result that is output may not be the optimal result and may suffer from unintended bias.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 3 depicts a table showing the calculation of weights for the imbalance dimension according to some embodiments.

FIG. 4 depicts a table that shows the calculation of a final weight according to some embodiments.

DETAILED DESCRIPTION

Figure 1:
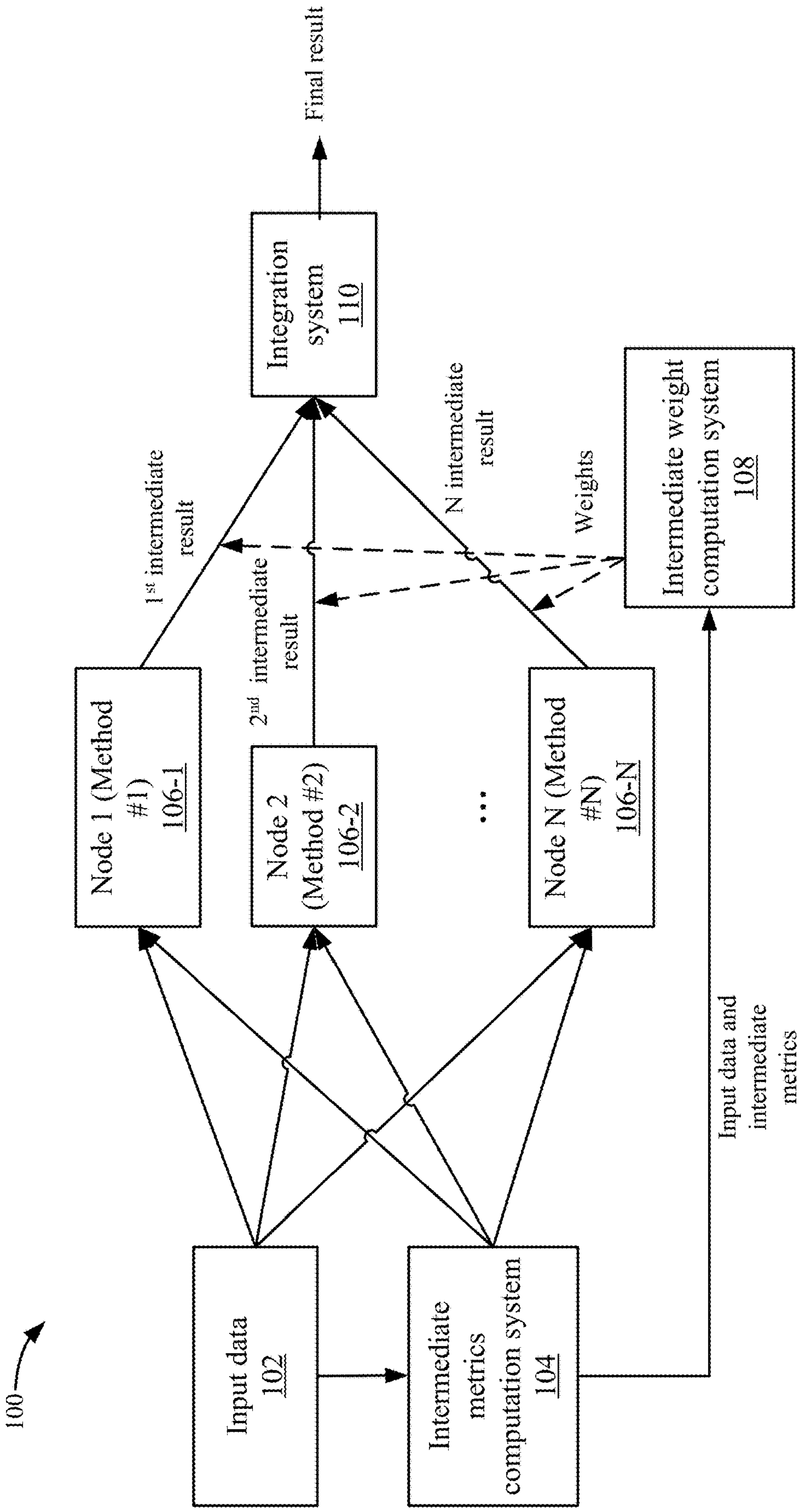
FIG. 1 depicts a simplified system for generating a final result for analyzing a causal impact on input data according to some embodiments.

Described herein are techniques for a data analysis system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

In some embodiments, a system may use multiple methods to analyze input data. For example, different methods may use different models for determining a causal inference from the input data may be used, such as the effect of a treatment on a group. The methods may generate what the system considers intermediate results. Then, the system may analyze weighting information, such as the input data, intermediate metrics, or the characteristics of the methods, to generate weights that can be applied to the intermediate results. The weights may be based on a performance evaluation of respective methods based on the input data. That is, some methods may perform more optimally than others in different situations. The weights may capture the performance differences among the methods. The weighted intermediate results may then be combined to generate a final result. The final result may provide the causal inference of the treatment on a group. For example, the final result may measure the impact of streaming a children's movie on long-term value of user accounts.

The value of weights may be difficult to determine for different methods. As discussed, the methods may perform differently based on different situations, such as different input data and different causal inference problems, and the selection of the weights as input data and the causal inference problems change may be difficult. To improve the generation of a weight for a method, the system may use multiple sub-weights that are combined together to generate a final weight. The final weight is then applied to the intermediate result from the method. In some embodiments, the sub-weights may be based on different dimensions, such as balance, dissimilarity, and reliability. The balance may be based on a balance between a characteristic of the input data, such as a balance between a control group and a treatment group. The treatment group may have the treatment applied to members of the group, and the control group may not have the treatment applied. The balance may be based on the differences between the groups, such as the treatment group may have 80 members and the control group may have 20 members. The dissimilarity may be based on the dissimilarity across methods. For example, if ten methods are quasi-identical, these ten methods may return quasi-identical estimates and may need to be down-weighted so these methods do not artificially pull the final output towards their results. The result reliability may be based on a confidence in the result, such as a confidence that the model outputs for its result or a prediction of confidence for the model. For example, the model may provide an estimate of a confidence interval for an intermediate result of the method. The system may generate sub-weights for the three dimensions, which are then combined to generate a final weight for the method.

The use of the multi-dimensional weights may improve the combination of the intermediate results from the methods. This results in an improved final result. For example, the use of a simple average may not capture that some methods may perform more optimally in different dimensions compared to other methods.

System

FIG. 1 depicts a simplified system 100 for generating a final result for analyzing a causal impact on input data according to some embodiments. System 100 includes input data 102, an intermediate metrics computation system 104, nodes #1, #2, . . . , N (nodes 106-1, 106-2, to 106-N), an intermediate weight computation system 108, and an integration system 110. Nodes 106-1 to 106-N may be collectively referred to as nodes 106.

Input data 102 may be a dataset that is generated for analysis and is input into nodes 106. In some embodiments, input data 102 may include data from a video delivery service, but other data sets may be used, such as information from park attendance, financial information, etc. Input data 102 may be split into a treatment group and a control group. The treatment group may have a treatment applied and the control group would not have the treatment applied. In some examples, the treatment group may have watched a children's movie and the control group may not have watched the children's movie.

A node 106 may be an instance of a computing device. Different instances of nodes 106 may be run on different computing devices or the same computing device. Nodes 106 may execute different methods to analyze input data 102. A method may include differences in logic to perform different analyses to generate a result. For example, each method may generate a conclusion about causal relationships between variables based on input data 102. Examples of different methods may include causal machine learning, such as S-Learner (e.g., Single learner), T-Learner (e.g., Two-Learner), X-Learner (e.g., Cross-Learner); regression, such as linear regression; inverse probability weighting, doubly robust estimation; and propensity score matching. Each of the above methods may use different logic to determine a result based on the causal relationship between variables in input data 102. Although the above methods are listed, other methods may be used.

The use of multiple methods may improve the generation of the final result. For example, some methods may perform optimally with some data sets or causal inferences, but not in other analyses. However, it may be hard to determine which method to use. Using multiple methods may yield better results than using one method. Across multiple different analyses using different input data or different causal inferences, the final results that are output may be improved in comparison to using the same method over the multiple different analyses. The use of multiple methods provides robustness to different situations that are encountered. However, it may be recognized that some methods may be more appropriate in an analysis than others. The following will describe the use of weights to compensate for predicted performance of respective methods.

As shown, each node 106 may output an intermediate result. Intermediate weight computation system 108 may generate weights for the intermediate results. The weights may be based on weighting data, which may be based on input data 102, intermediate metrics, or the respective methods being used. Intermediate weight computation system 108 may receive input data 102 or intermediate metrics data from intermediate metrics computation system 104. Intermediate metrics may be computed based on input data 102. Intermediate weight computation system 104 may analyze input data 102, which may be raw data, to extract data that may be useful to generate weights. It would not be practical for a human to analyze input data 102 and come up with results that were accurate or comparable to the present results. Input data 102 may include tens/hundreds of millions of observations, and each method applies advanced calculations that cannot be applied by a human user. The methods output superior results that cannot be made by a human given the input data. In some examples, the intermediate metrics may be a percentage of users that are treated with the treatment versus in the control group, a prediction from a model of how likely a user was to receive the treatment (e.g., a propensity score), a percentage overlap in propensity scores between a treatment group and the control group, etc. The intermediate metrics may be generated by a machine due to the large amount of raw data that needs to be analyzed in a timely manner. It would not be practical for a human user to generate the intermediate metrics given the size of input data 102 that may be required to perform the analysis.

Intermediate weight computation system 108 then uses the intermediate metrics to generate weights for respective nodes 106. The weights may be based on different dimensions. For example, three sub-weights in three dimensions are calculated for each method. Then, the three sub-weights may be combined into a final weight for each respective method. Although three sub-weights are discussed, different numbers of sub-weights may be used.

The three dimensions may include balance, dissimilarity, and reliability. The balance dimension may be based on a balance between two groups, such as a control group and a treatment group. The balance may be measured by differences in characteristics between the control group and the treatment group that is found in the intermediate metrics. For example, the number of members in each group may be used to determine an imbalance between the groups. In some examples, the control group may have 80 members and the treatment group may have 20 members, and an 80/20 imbalance may be determined. Other methods of determining balance may also be used, such as determining an imbalance in characteristics among members. Using balance as a sub-weight may improve the calculation of weights. For example, different methods may perform differently based on imbalance, such as some methods may not be reliable when imbalance is greater than a threshold. A higher weight may mean the data is more balanced.

The dissimilarity dimension may measure dissimilarity across methods. The dissimilarity may be discussed using similarity or dissimilarity where methods that are similar may be weighted lower, methods that are less similar may be weighted higher, methods that are dissimilar may be weighted higher, and methods that are less dissimilar are weighted lower. Depending on the similarity across methods, different methods may be weighted differently based on the dissimilarity of a method to other methods. For example, as discussed above, if ten methods are quasi-identical, the ten methods may return quasi-identical estimates that may need to be down-weighted because the ten methods may artificially pull the final output towards that value. The dissimilarity may be determined based on logic associated with the methods. A higher weight may mean the methods are more dissimilar.

The reliability dimension may measure result reliability based on model performance. Each method may provide an estimate of confidence intervals of its result. The wider the interval, the more uncertainty may be encountered with the result. Less weight may be used on a result that has more uncertainty in some examples. The reliability may be based on a prediction of reliability based on input data 102 or intermediate metrics. Also, each method may output an indication of reliability when input data 102 is analyzed. A higher weight may mean the method is more confident in the result.

Intermediate weight computation system 108 may use the above dimensions to generate sub-weights that are then used to generate a final weight for each respective method. The respective final weights are applied to the respective intermediate result from each method. Intermediate weight computation system 108 may also use the weights to improve technical aspects of system 100. For example, intermediate weight computation system 108 may be separate from the logic of respective methods 106. This allows the weight computation to be performed faster compared to having the weight computation being performed by each method because the logic for computing the weights does not depend on executing logic of the method. Also, intermediate weight computation system 108 may take into account the methods being used in system 100 to calculate the weights. It would be harder for individual methods to take into account the methods being used in system 100 to calculate the weights. Intermediate weight computation system 108 may also use the weights to improve the resources being used. For example, methods with lower weights may not be used. In this case, intermediate weight computation system 108 could communicate with nodes 106 to not run certain methods. For example, the top ten ranked methods per the weights may only be run or the bottom ten ranked methods per the weights may be removed.

Integration system 110 may then use the weighted intermediate results to generate a final result. The final result may be generated based on different methods, such as a weighted average of the results or another combination of the results. The generation of the final result may be improved because the weights that are generated include different dimensions that capture the performance of a method with more granularity. The weights may weigh some methods that may be more appropriate in some dimensions, but not appropriate in the other dimensions. Across multiple different analyses using different input data or different causal inferences, the final results that are output may be improved in comparison to using the same weights over the multiple different analyses.

The following will describe the weight calculation and then the generation of the final result.

Weight Calculation

Figure 2:
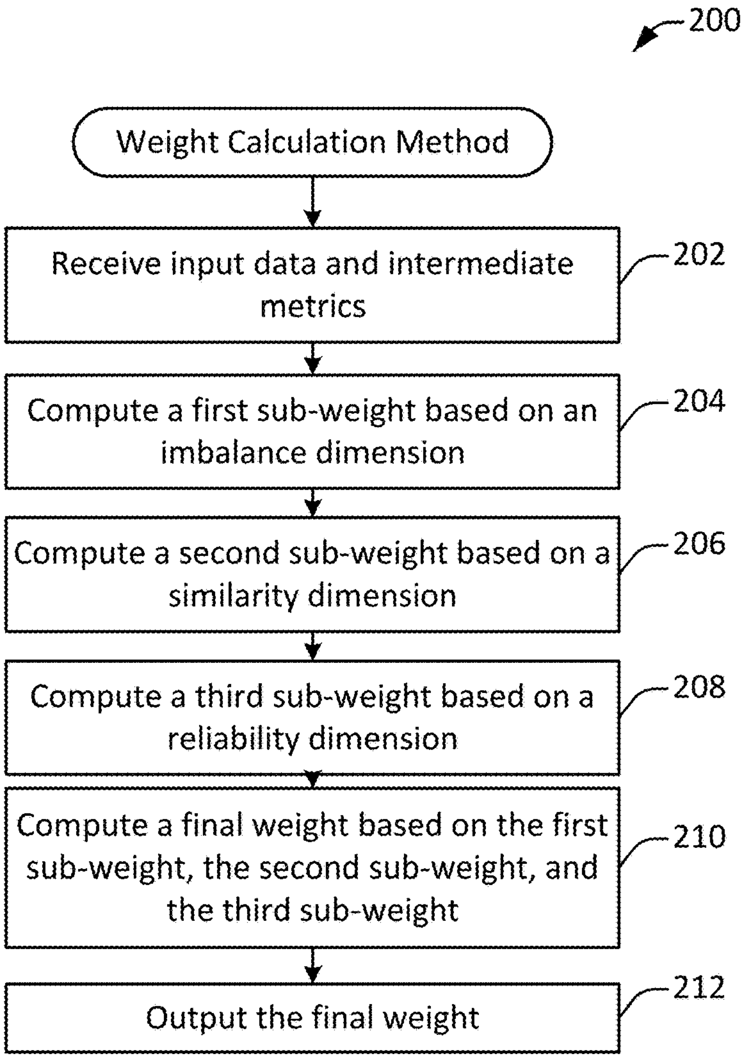
FIG. 2 depicts a simplified flowchart of a method for calculating a weight according to some embodiments.

FIG. 2 depicts a simplified flowchart 200 of a method for calculating a weight according to some embodiments. At 202, intermediate weight computation system 108 receives input data 102 and the intermediate metrics. In some embodiments, intermediate metrics may not be used, and input data 102 may be analyzed directly. At 204, intermediate weight computation system 108 computes a first sub-weight based on a balance dimension. Intermediate weight computation system 108 may determine weighting information that can be used for calculating the balance. For example, the weighting information may be from the intermediate metrics, input data 102, or logic associated with the method. In some embodiments, the intermediate metrics may include the number of members in the target group and the control group to calculate the imbalance between the two groups.

At 206, intermediate weight computation system 108 computes a second sub-weight based on a dissimilarity dimension. Intermediate weight computation system 108 may determine weighting information that can be used for calculating the dissimilarity. For example, the methods being used in this computation, which may be indicated in input data 102 or the intermediate metrics, may indicate which methods are dissimilar.

At 208, an intermediate weight computation system 108 computes a third sub-weight based on a reliability dimension. Intermediate weight computation system 108 may determine weighting information that can be used for calculating the reliability. For example, the method may output a confidence interval for an intermediate result. Also, a prediction of the reliability may be generated. For example, an imbalance of groups may be computed from input data 102 or the intermediate metrics, which may be a strong indicator of the reliability of some methods. Propensity scores may be intermediate metrics computed for each member that can also be used to measure the overlap between control groups and treatment groups, and predict the performance of some methods that heavily rely on propensity scores. The computation of the first sub-weight, second sub-weight, and third sub-weight will be described in more detail below.

At 210, intermediate weight computation system 108 computes a final weight for each method based on the first sub-weight, the second sub-weight, the third sub-weight. The final weight may be derived using different methods. For example, the first sub-weight, the second sub-weight, and the third sub-weight may be multiplied together to calculate the final weight of method i, with "i" identifying one of the methods. In some embodiments, the final weighted average is computed based on:

$$Est = \frac{\sum_{i=1}^{N} w_i Est_i}{\sum_{i=1}^{N} w_i},$$

where Est is the final weighted average, $w_i$ is the weight of method i, and $Est_i$ is treatment estimate of method i, where i identifies the methods 1, 2, N In another example, individual weights may be optimized using another model. For example, simulations may be run where the true treatment effect is known, and for each simulation, the estimates for each method as well as the individual weights are calculated. A model is run to balance these weights to determine the optimal combination of the weights. For example, depending on the balance of weights, an optimized weighted average of the three weights may be generated. In some embodiments, a regression model may be used as follows:

$$trt \sim \frac{\sum_{i=1}^{N} (\alpha w_{i,a} + \beta w_{i,s} + \gamma w_{i,r}) Est_i}{\sum_{i=1}^{N} \alpha w_{i,a} + \beta w_{i,s} + \gamma w_{i,r}},$$

where trt is a variable representing the true known treatment effect, alpha, beta, and gamma are variables, and $w_{i,b}$, $w_{i,s}$, and $w_{i,r}$ are weights for balance, dissimilarity, and reliability, respectively. Simulations can be run where the true treatment effect trt is known, and for each simulation, the system computes the estimates from each method as well as the individual weights. A result would be the optimal values for alpha, beta, and omega. Given the weights, the values of alpha, beta, and omega would be used to determine an optimized weighted average. The values of alpha, beta, and omega may be updated as needed, such as when a new method is added.

At 212, intermediate weight computation system 108 may output the final weight. The final weight may then be used to apply a weight to the intermediate result from the respective method.

The above process may be performed for each method. Each method may result in different weights for the different dimensions based on the input data, intermediate metrics, or the logic of the specific method. For example, some methods may perform better when imbalance that is present, and one method is weighted higher for the imbalance and another method is weighted lower for the imbalance.

The following will now describe the calculation of the sub-weights in more detail. In some embodiments, the calculation of the first sub-weight may use how the method performs under different treatment-to-control ratios. For example, a method that is based on propensity score matching may perform poorly on severely imbalanced data, such as when a very small proportion of members receive the treatment, or a large proportion of users do not receive the treatment. Intermediate weight computation system 108 may analyze the performance of different methods for different treatment-to-control ratios and determine the weights for the respective methods. The methods may be ranked based on respective error in each treatment-to-control ratio. FIG. 3 depicts a table 300 showing the calculation of weights for the imbalance dimension according to some embodiments. Table 300 includes columns 302, 304, 306, 308, and 310 for a treatment-to-control ratio, a method, an absolute error, a rank, and a ranked weight, respectively.

The treatment-to-control ratio may be the comparison of the number of members in the treatment group to the comparison of the number of members in the control group. For example, a 10:90 treatment-to-control ratio may indicate there are 10 members in the treatment group to 90 members in the control group.

The method column may indicate the method that is ranked. There are three methods of A, B, and C in this example. The absolute error may be the measurement of the error that results when using the treatment-to-control ratio. The rank may indicate the rank of a respective method for the respective treatment-to-control ratio based on the absolute error. The ranked weight may generate a weight based on the ranking, such as the ranked weight may be 1/rank in order to provide greater weights to the methods with the least error, but there may be other ways to generate the ranked weight.

Table 300 may include two different treatment-to-control ratios of 10:90 in the first three rows at 312 and 20:80 in rows 3-6 at 314. The respective methods A, B, and C may be ranked based on the respective absolute errors. For example, for the treatment control ratio of 10:90, method A has an absolute error of 0.3, method B has an absolute error of 0.1, and method C has an absolute error of 0.5. Because method B has the lowest absolute error, it is ranked first, method A has the second lowest absolute error of 0.3, and it is ranked second followed by method C. Similarly, for the treatment control ratio of 20:80, method A is ranked first, method C is ranked second, and method B is ranked third based on respective absolute error of 0.04, 0.06, and 0.1, respectively.

The respective ranked weight for the methods may be 1/2, 1/1, and 1/3 for the treatment control ratio 10:90 for methods A, B, and C, respectively. The weight of 1/1 for method B may apply a highest sub-weight to the intermediate result from method B for the treatment-to-control ratio 10:90. This is because method B may have the lowest absolute error and may be the most reliable when this imbalance is encountered. Method C may be ranked the lowest with a 1/3 weight because method C's absolute error may be the highest at 0.5, and its result may be the least reliable. The ranked weights for the 20:80 treatment-to-control ratio are determined similarly.

Given the treatment-to-control ratio that is found in the intermediate metrics, intermediate weight computation system 108 may look up the treatment-to-control ratio for the specific method, and determine the ranked weight that should be used. For example, if the intermediate metrics indicate that the 20:80 treatment-to-control ratio is found in input data 102 or the intermediate metrics, intermediate weight computation system 108 assigns a weight of 1/1 to method A, a weight of 1/3 to method B, and a weight of 1/2 for method C. If any new methods are added, the simulation may be rerun with all the methods to rank all the methods again, and the ranked weights are recomputed.

For the dissimilarity dimension, the weight may estimate the dissimilarity of a respective method to other methods. A weight of 1/(number of correlated methods) may be used. For example, if there are three correlated methods (inclusive of the current method), then a weight of 1/3 may be provided to the current method and the other correlated methods. Also, if there are no correlated methods, the weight may be 1/1. The dissimilarity weight may down-rank dissimilar methods that may produce similar results. This may avoid a situation where a final result is pulled towards the similar results of similar methods.

The reliability dimension may generate a weight based on the uncertainty that is associated with the intermediate result. For example, if a confidence interval is output by a respective method, the weight may be based on the confidence interval, such as 1/width of confidence interval (CIW) (e.g., 1/CIW). If the confidence interval is larger, then the weight of the reliability dimension may be lower. This weight is lower because the intermediate result from the respective method may not be as reliable as an intermediate result from a method that has a smaller confidence interval, which means the method is more confident in the result. Accordingly, the methods that output intermediate results with more confidence may be weighted higher, which may reduce uncertainty in the final result. The confidence interval may be received from each method after the intermediate result is calculated. Also, the confidence interval may be calculated based on the intermediate metrics or input data 102. For example, based on the intermediate metrics, predicted confidence intervals may be determined for each method.

FIG. 4 depicts a table 400 that shows the calculation of a final weight according to some embodiments. Columns 402, 404, 406, 408, and 410 indicate the method, balance, dissimilarity across methods, model reliability, and final weight for the method.

The method column lists examples of different methods that can be used, but other methods can be used. In this example, the methods of S-learner, T-learner, X-learner, linear regression, inverse probability weighting, doubly robust estimation, and propensity score matching are used. The balance weight is shown in column 404. The balance sub-weight may be based on the lookup of the sub-weight as described with respect to FIG. 3. Each sub-weight may be provided for the respective method, such as a weight W_S,B indicates the weight for S-learner, which may be 1/3, and the weight for W_T, B may be the weight for T-learner and maybe 1/1, etc. A higher balance weight may mean more balance between the groups.

In column 406, a dissimilarity sub-weight is calculated. A higher dissimilarity weight means more dissimilarity among methods. In this example, the dissimilarity sub-weight for the S-learner, T-learner, and X-learner is 1/3 because these three methods may be deemed similar. Also, the methods of linear regression, inverse probability weighting, and doubly robust estimation are deemed similar, and the respective sub-weights for these methods are 1/3. Propensity score matching is not deemed similar to any other methods, and the weight W_S, S is 1/1=1.

The reliability for each respective method is 1/CIW, where the value of CIW is the confidence interval that is determined for each respective method.

The final weight may be or may be calculated by combining the three sub-weights from balance, dissimilarity, and reliability in columns 404, 406, and 408. The combination may multiply the sub-weights together in this example. However, other combinations may be appreciated as described above, such as using the optimized weighted average of the three sub-weights. Once receiving the final weights, the final result may be calculated.

Final Result Calculation

Figure 5:
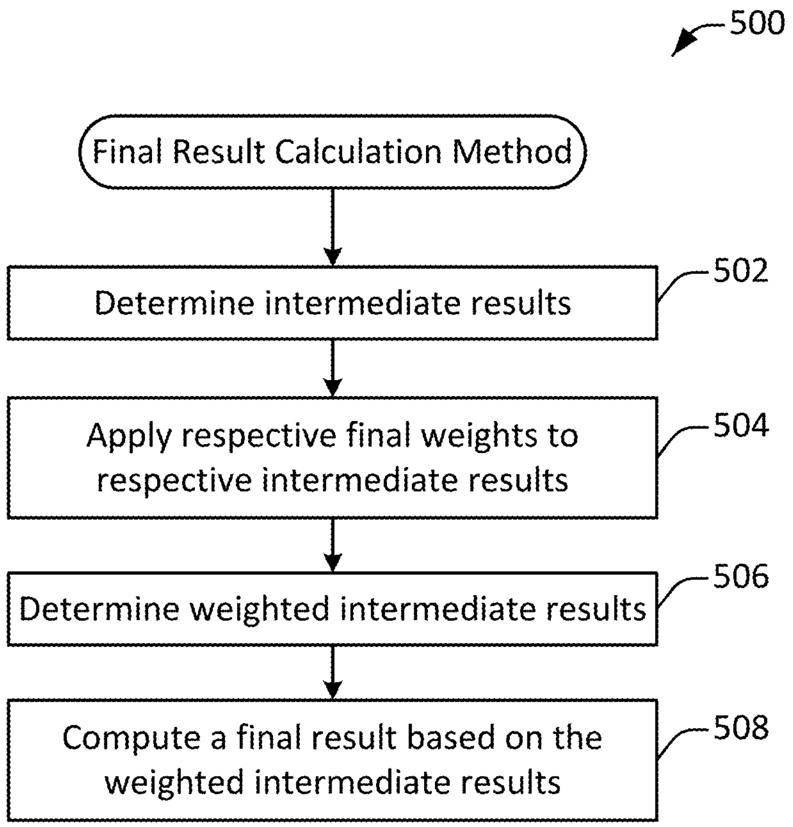
FIG. 5 depicts a simplified flowchart of a method for calculating the final result according to some embodiments.

FIG. 5 depicts a simplified flowchart 500 of a method for calculating the final result according to some embodiments. At 502, intermediate weight computation system 108 determines the intermediate results from respective methods. Then, at 504, intermediate weight computation system 108 applies respective final weights to the intermediate results. For example, an intermediate result from method #1 is applied a final weight that is associated with method #1. Then, an intermediate result from method #2 is applied a final weight for method #2 etc.

At 506, the weighted intermediate results are determined based on applying the final weights to the respective intermediate results. Then, at 508 integration system 110 may compute the final result based on the intermediate results. The final result may provide a value for answering a causal inference of variable from input data 102. For example, the value may be there is an incremental 10% probability of a user account performing some action when watching a movie title compared to a user account that did not watch the movie title.

Figure 6:
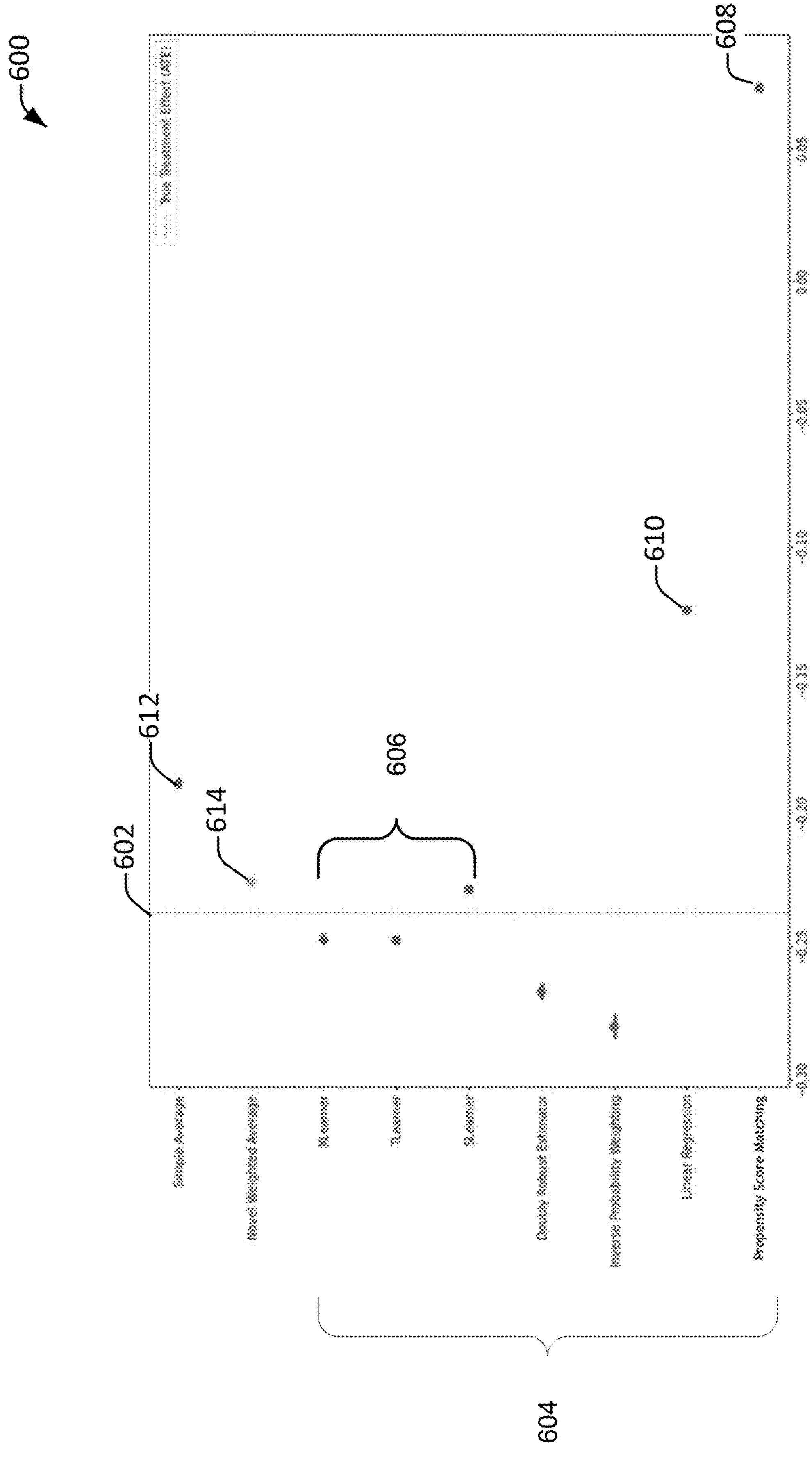
FIG. 6 depicts a table that uses input data that has an imbalance according to some embodiments.

The following will describe how applying weights to the intermediate results provides an improvement in the final result. FIG. 6 depicts a table 600 that uses input data 102 that has an imbalance according to some embodiments. The imbalance may be the treatment-to-control ratio of 10:90, or 10% of the total population has the treatment applied. Each method may be applied individually, and results in an intermediate result that is output. A true treatment effect is shown at 602. Accordingly, values that are closer to the true treatment effect value at 602 may be more accurate.

The individual methods may be shown at 604. For example, the methods of X-learner, T-learner, S-learner, doubly robust estimation, inverse probability weighting, linear regression, and propensity score matching are used. As shown, at 606, the intermediate results of X-learner, T-learner, and S-learner are closer to the true treatment effect at 602. However, at 608, the intermediate result for propensity score matching, and, at 610, the intermediate result for linear regression are farther away from the true treatment effect.

If the simple average is taken of the intermediate results from all the methods, the result is shown at 612. However, if using the present method of weighting the intermediate results of different methods, the value at 614 is generated. The value at 614 is closer to the true treatment effect at 602 than the simple average at 612 because intermediate weight computation system 108 may have recognized that the X-learner, T-learner, and S-learner methods may be more accurate. Accordingly, these intermediate results may be weighted higher, whereas intermediate weight computation system 108 may determine that the methods of linear regression and propensity score matching may not produce as accurate intermediate results, and down-weighted these intermediate results.

Figure 7:
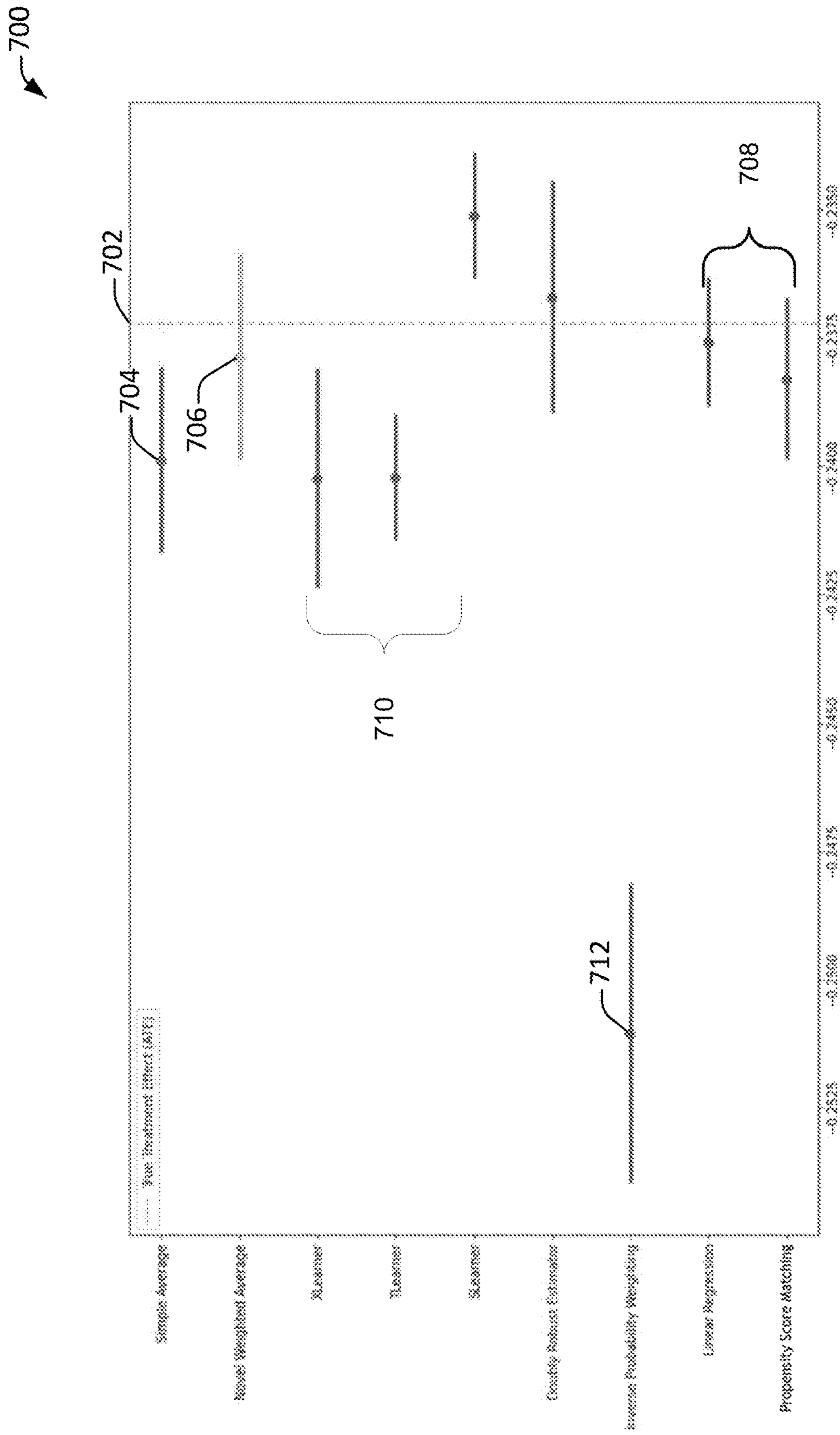
FIG. 7 depicts another example of final results according to some embodiments.

FIG. 7 depicts another example 700 of final results according to some embodiments. At 702, the true treatment effect value is shown. A range of values for other methods are shown. The range may be estimated based on a point and a confidence interval that provides a range of values. Then, at 704, a range for the simple average of the intermediate results that are output by the methods is shown. At 706, the optimized weighted average using present embodiments is shown. It can be seen that the weighted average generated as the final result according to the present embodiments may be more accurate because the range is closer to the true treatment effect at 702.

The performance of the methods may be different in this example. The propensity score matching and linear regression methods outperform the X-learner, T-learner and S-learner methods. At 708, as the linear regression and propensity score matching intermediate results are closer to the true treatment effect, intermediate weight computation system 108 may determine that the linear regression and propensity score matching methods may be more accurate and weights their intermediate results higher than the X-learner, T-learner and S-learner intermediate results.

Further, intermediate weight computation system 108 may determine that the inverse probability weighting value is very inaccurate at 712, and weigh this respective intermediate result very low. The weights may be determined due to the recognition that linear regression and propensity score matching may perform better with this type of treatment-to-control ratio, where the treatment group receives 50% of the population (e.g., 50:50). The intermediate result for linear regression and propensity score matching at 708 may be closer to the true treatment effect compared to the intermediate results at 710 for the methods of X-learner, T-learner, and S-learner. If a single method is used, it may be hard to determine which method may be best for the analysis. However, using multiple methods that are weighted based on different dimensions may improve results in a current analysis and over multiple analysis.

Conclusion

Accordingly, by using specialized sub-weights that may be based on intermediate metrics, input data 102, or the logic of the methods, multiple methods may be used and weighted accordingly. The weights may be calculated in an improved manner using sub-weights to represent the performance of each respective method. The intermediate results from respective methods are weighted based on each respective characteristics of the methods, the intermediate metrics, or input data 102. The weights improve the calculation of the final result and the final result may be generally more accurate and closer to a true treatment effect than an individual method.

System

Figure 8:
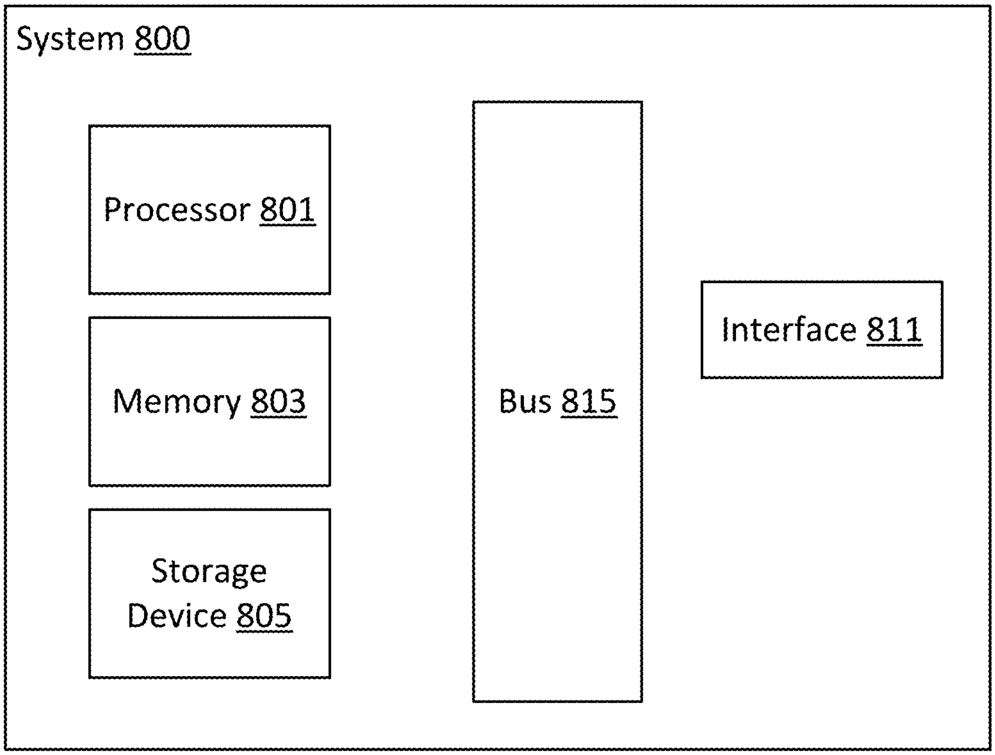
FIG. 8 illustrates one example of a computing device.

FIG. 8 illustrates one example of a computing device. According to various embodiments, a system 800 suitable for implementing embodiments described herein includes a processor 801, a memory module 803, a storage device 805, an interface 811, and a bus 815 (e.g., a PCI bus or other interconnection fabric.) System 800 may operate as a variety of devices such as any device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. Memory 803 may be random access memory (RAM) or other dynamic storage devices. Storage device 805 may include a non-transitory computer-readable storage medium holding information, instructions, or some combination thereof, for example instructions that when executed by the processor 801, cause processor 801 to be configured or operable to perform one or more operations of a method as described herein. Bus 815 or other communication components may support communication of information within system 800. The interface 811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A system comprising:

a plurality of nodes configured to receive input data to calculate an effect of a variable on a group for a plurality of methods, wherein methods in the plurality of methods calculate the effect of the variable for the input data using different logic;

an intermediate weight computation system configured to:

generate a plurality of sub-weights for respective methods in the plurality of methods, wherein the sub-weights include a first sub-weight a second sub-weight and a third sub-weight that are generated based on a balance metric, a dissimilarity metric, and a reliability metric, respectively;

combine the first sub-weight, the second sub-weight, and the third sub-weight in the plurality of sub-weights for respective methods in the plurality of methods to generate a final weight for the respective methods; and apply the respective final weight to an intermediate result from a respective method in the plurality of methods to generate a weighted intermediate result for the method; and an integration system configured to combine weighted intermediate results for the plurality of methods to generate a final result for the effect of the variable.

2. The system of claim 1, wherein the input data is analyzed to determine intermediate metrics, wherein the intermediate metrics are used to generate at least one of the sub-weights.

3. The system of claim 1, wherein the intermediate weight computation system is configured to:

analyze logic of one or more methods to generate at least one of the sub-weights.

4. The system of claim 1, wherein the balance metric is based on a balance of a difference of a characteristic in the input data.

5. The system of claim 1, wherein the balance metric is based on a balance between a first group and a second group in the input data, wherein the first group has the variable applied.

6. The system of claim 5, wherein:

the balance metric is based on a first number of members in the first group and a second number of members in the second group, and methods in the plurality of methods are ranked based on a performance associated with different balances.

7. The system of claim 1, wherein the dissimilarity metric is based on a dissimilarity of a first method to a second method.

8. The system of claim 1, wherein:

the dissimilarity metric for a first method is based on a number of methods that are indicated as having similar logic.

9. The system of claim 8, wherein:

a sub-weight for the dissimilarity metric for a first method is decreased based on the first method having logic being similar to methods in the number of methods.

10. The system of claim 8, wherein:

a sub-weight for the dissimilarity metric for a first method is sub-weight=1/(number of methods).

11. The system of claim 1, wherein the reliability metric is based on a confidence score that is associated with the intermediate result for a method.

12. The system of claim 11, wherein the confidence score is output by the method based on generating the intermediate result.

13. The system of claim 11, wherein the confidence score is determined by predicting a confidence of generating the intermediate result.

14. The system of claim 11, wherein the sub-weight based on the reliability metric is determined using sub-weight=1/(confidence score).

15. The system of claim 1, wherein combine the plurality of sub-weights comprises:

generate an average of the plurality of sub-weights for a method.

16. The system of claim 1, wherein combine the plurality of sub-weights comprises:

determine variable values for the plurality of sub-weights, wherein the variable values are generated based on an optimal combination of the sub-weights, and generate the final weight based on the variable values and the plurality of sub-weights for a method.

17. A method comprising:

receiving, by a computing device, input data to calculate an effect of a variable on a group for a plurality of methods, wherein methods in the plurality of methods calculate the effect of the variable for the input data using different logic;

generating, by the computing device, a plurality of sub-weights for respective methods in the plurality of methods, wherein the sub-weights include a first sub-weight, a second sub-weight, and a third sub-weight that are generated based on a balance metric, a dissimilarity metric, and a reliability metric respectively;

combining, by the computing device, the first sub-weight, the second sub-weight, and the third sub-weight in the plurality of sub-weights for respective methods in the plurality of methods to generate a final weight for the respective methods;

applying, by the computing device, the respective final weight to an intermediate result from a respective method in the plurality of methods to generate a weighted intermediate result for the method; and combining, by the computing device, weighted intermediate results for the plurality of methods to generate a final result for the effect of the variable.

18. The method of claim 17, further operable for:

analyzing the input data to determine intermediate metrics, wherein the intermediate metrics are used to generate at least one of the sub-weights.

19. The method of claim 17, further operable for: wherein combining the plurality of sub-weights comprises:

determining variable values for the plurality of sub-weights, wherein the variable values are generated based on an optimal combination of the sub-weights, and generating the final weight based on the variable values and the plurality of sub-weights for a method.

20. A non-transitory computer-readable storage medium comprising instructions for controlling one or more computer processors to be operable for:

receiving, by a computing device, input data to calculate an effect of a variable on a group for a plurality of methods, wherein methods in the plurality of methods calculate the effect of the variable for the input data using different logic;

generating, by the computing device, a plurality of sub-weights for respective methods in the plurality of methods, wherein the sub-weights include a first sub-weight, a second sub-weight, and a third sub-weight that are generated based on a balance metric, a dissimilarity metric, and a reliability metric, respectively;

combining, by the computing device, the first sub-weight the second sub-weight, and the third sub-weight in the plurality of sub-weights for respective methods in the plurality of methods to generate a final weight for the respective methods;

applying, by the computing device, the respective final weight to an intermediate result from a respective method in the plurality of methods to generate a weighted intermediate result for the method; and combining, by the computing device, weighted intermediate results for the plurality of methods to generate a final result for the effect of the variable.

* * * * *